United States Patent
Winzer et al.

(10) Patent No.: US 9,203,682 B2
(45) Date of Patent: Dec. 1, 2015

(54) FREQUENCY-DEPENDENT I/Q-SIGNAL IMBALANCE CORRECTION COHERENT OPTICAL TRANSCEIVERS

(75) Inventors: Peter J. Winzer, Aberdeen, NJ (US); Xiang Liu, Marlboro, NJ (US); Chandrasekhar Sethumadhavan, Matawan, NJ (US); Alan H. Gnauck, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 693 days.

(21) Appl. No.: 12/876,489

(22) Filed: Sep. 7, 2010

(65) Prior Publication Data

US 2012/0057863 A1    Mar. 8, 2012

(51) Int. Cl.
| | |
|---|---|
| H04B 10/00 | (2013.01) |
| H04L 27/38 | (2006.01) |
| H04B 10/60 | (2013.01) |
| H04B 10/61 | (2013.01) |
| H04L 27/00 | (2006.01) |

(52) U.S. Cl.
CPC ............ *H04L 27/3863* (2013.01); *H04B 10/60* (2013.01); *H04B 10/611* (2013.01); *H04B 10/613* (2013.01); *H04L 27/0014* (2013.01)

(58) Field of Classification Search
USPC .................. 398/135–138, 208–211
See application file for complete search history.

(56) References Cited

U.S. PATENT DOCUMENTS

| | | | |
|---|---|---|---|
| 5,781,589 A * | 7/1998 | Yom | 375/340 |
| 5,845,093 A | 12/1998 | Fleming | |
| 6,683,855 B1 | 1/2004 | Bordogna et al. | |
| 6,917,031 B1 * | 7/2005 | Sun et al. | 250/214 R |
| 7,158,586 B2 * | 1/2007 | Husted | 375/324 |
| 7,212,741 B2 | 5/2007 | Myong et al. | |
| 7,266,310 B1 | 9/2007 | Savory et al. | |
| 7,315,575 B2 * | 1/2008 | Sun et al. | 375/229 |
| 7,382,984 B2 | 6/2008 | McNichol et al. | |
| 7,424,651 B2 | 9/2008 | Domagala et al. | |
| 7,472,155 B2 | 12/2008 | Simkins et al. | |
| 7,532,820 B2 | 5/2009 | Aronson | |
| 7,570,889 B2 | 8/2009 | Shastri et al. | |
| 7,574,146 B2 | 8/2009 | Chiang et al. | |

(Continued)

OTHER PUBLICATIONS

Equalization. (2001). In Hargrave's Communications Dictionary, Wiley. Retrieved from http://www.credoreference.com/entry/hargravecomms/equalization.*

(Continued)

*Primary Examiner* — David Payne
*Assistant Examiner* — Tanya Motsinger
(74) *Attorney, Agent, or Firm* — Mendelsohn, Drucker & Dunleavy, P.C.; Yuri Gruzdkov

(57) ABSTRACT

In one embodiment, a coherent optical receiver has a digital signal processor that processes one or more digital I/Q-signal pairs to recover data carried by a modulated optical signal in a manner that mitigates, based on calibration data retrieved from a memory or on appropriate performance measures and feedback mechanisms, the detrimental effects of frequency-dependent imbalances between the I and Q sub-channels of at least one of the I/Q channels of the receiver. In various embodiments, the calibration data can be generated and written into the memory at the fabrication facility or in situ while the receiver is being operated in a calibration mode. Alternatively or in addition, the calibration data can be generated and dynamically adjusted online during normal operation of the receiver.

19 Claims, 7 Drawing Sheets

(56) References Cited

U.S. PATENT DOCUMENTS

| | | | |
|---|---|---|---|
| 7,623,578 B2 | 11/2009 | Pisoni et al. | |
| 7,688,918 B2 | 3/2010 | Koc | |
| 7,734,191 B1 | 6/2010 | Welch et al. | |
| 7,747,169 B2 | 6/2010 | Koc | |
| 7,747,177 B2 | 6/2010 | Chen et al. | |
| 7,769,305 B1* | 8/2010 | Roberts et al. | 398/206 |
| 7,839,314 B2* | 11/2010 | Cetin et al. | 341/120 |
| 7,894,728 B1* | 2/2011 | Sun et al. | 398/208 |
| 7,925,217 B2* | 4/2011 | Park et al. | 455/67.11 |
| 8,670,679 B2* | 3/2014 | Chung et al. | 398/208 |
| 8,687,974 B2* | 4/2014 | Zelensky et al. | 398/158 |
| 8,693,897 B2* | 4/2014 | Mo et al. | 398/208 |
| 8,805,208 B2* | 8/2014 | Zhang et al. | 398/208 |
| 9,025,969 B2* | 5/2015 | Li et al. | 398/208 |
| 2003/0007574 A1* | 1/2003 | Li et al. | 375/316 |
| 2003/0072393 A1* | 4/2003 | Gu | 375/322 |
| 2004/0067064 A1* | 4/2004 | McNicol et al. | 398/158 |
| 2005/0196176 A1* | 9/2005 | Sun et al. | 398/152 |
| 2007/0206963 A1* | 9/2007 | Koc | 398/202 |
| 2008/0075472 A1* | 3/2008 | Liu et al. | 398/202 |
| 2008/0152361 A1* | 6/2008 | Chen et al. | 398/205 |
| 2009/0119043 A1* | 5/2009 | Tao et al. | 702/66 |
| 2009/0316839 A1* | 12/2009 | Su | 375/340 |
| 2010/0008449 A1* | 1/2010 | Sayers | 375/322 |
| 2010/0142952 A1* | 6/2010 | Qian et al. | 398/65 |
| 2010/0158521 A1 | 6/2010 | Doerr et al. | |
| 2010/0232797 A1* | 9/2010 | Cai et al. | 398/79 |
| 2010/0232809 A1* | 9/2010 | Cai et al. | 398/202 |
| 2010/0303474 A1* | 12/2010 | Nakashima et al. | 398/210 |
| 2011/0129230 A1* | 6/2011 | Zanoni et al. | 398/140 |
| 2011/0142449 A1* | 6/2011 | Xie | 398/65 |
| 2012/0148255 A1* | 6/2012 | Liu et al. | 398/136 |

OTHER PUBLICATIONS

Dispersion. (2001). In Hargrave's Communications Dictionary, Wiley. Retrieved from http://www.credoreference.com/entry/hargravecomms/dispersion.*

Doerr, Christopher R., "Coherent Receiver Having an Interleave-Chirped Arrayed Waveguide Grating," U.S. Appl. No. 12/541,548, filed Aug. 14, 2009 (25 pages).

Doerr, Christopher R., "Coherent Optical Detector Having a Multifunctional Waveguide Grating," PCT International Application No. PCT/US09/37746, filed Mar. 20, 2009 (20 pages).

Fatadin, Irshaad, "Compensation of Quadrature Imbalance in an Optical QPSK Coherent Receiver," IEEE Photonics Technology Letters, vol. 20, No. 20, Oct. 15, 2008, pp. 1733-1735.

Lowery, Arthur James et al., "Orthogonal-Frequency-Division Multiplexing for Dispersion Compensation of Long-Haul Optical Systems," Optics Express, vol. 14, No. 6, Mar. 20, 2006, pp. 2079-2084.

International Search Report and Written Opinion; Mailed Feb. 2, 2012 for corresponding PCT Application No. PCT/US2001/050170.

Al Amin et al: "A hybrid IQ Imbalance Compensation Method for Optical OFDM Transmission"; Otics Express, vol. 18, No. 5.; Mar. 1, 2010; p. 4859; XP55017595.

Chung et al: "Effect of IQ Mismatch Compensation in an Optical Coherent OFDM Receiver"; IEEE Photonics Technology Letters, IEEE Service Center, Piscataway, NJ, US, vol. 22, No. 5, Mar. 1, 2010; pp. 308-310; XP011300029.

Al Amin et al: "Effect of Hybrid IQ Imbalance compensation in 27.3-Gbit/s Direct-Detection OFDM Transmission", Optical Fiber Communication; OFC 2009; Conference on, IEEE, Piscataway, NJ, USA, Mar. 22, 2009; pp. 1-3; XP031467967.

* cited by examiner

200

300

310

400

500

600

FREQUENCY-DEPENDENT I/Q-SIGNAL IMBALANCE CORRECTION COHERENT OPTICAL TRANSCEIVERS

BACKGROUND

1. Field of the Invention

The present invention relates to optical communication equipment and, more specifically but not exclusively, to signal processing in coherent optical transceivers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A coherent optical-detection scheme is capable of detecting not only the amplitude of an optical signal, but also the signal's phase. These capabilities make coherent optical detection compatible with the use of spectrally efficient modulation formats, such as quadrature-amplitude modulation (QAM) and phase-shift keying (PSK) in their various forms. Compared to non-coherent optical detectors, coherent optical detectors offer relatively easy wavelength tunability, good rejection of interference from adjacent channels in wavelength-division-multiplexing (WDM) systems, linear transformation of the electromagnetic field into an electrical signal for effective application of modern digital-signal-processing techniques, and an opportunity to use polarization-division multiplexing (PDM).

A coherent optical receiver usually employs an optical mixer that combines a received optical communication signal and a local-oscillator (LO) signal to generate one or more in-phase (I) signals and one or more quadrature-phase (Q) signals. Ideally, the I and Q signals corresponding to the same component of the optical communication signal are orthogonal to one another. However, implementation imperfections, such as incorrect biasing of the optical mixer, imperfect signal splitting in optical couplers, variability in the optical-to-electrical (O/E) conversion characteristics of photodiodes, etc., can create amplitude and phase imbalances between the I and Q sub-channels of an I/Q channel. These imbalances translate into a bit-error-rate penalty, which rapidly grows with an increase in the constellation size, e.g., to a size larger than four constellation points, such as a constellation larger than the quadrature-phase shift keying (QPSK) constellation which has four constellation points.

SUMMARY

Disclosed herein are various embodiments of a coherent optical receiver having one or more I/Q channels for converting a modulated optical signal into one or more corresponding digital I/Q-signal pairs. The coherent optical receiver further has a digital signal processor that processes the one or more digital I/Q-signal pairs to recover the data carried by the modulated optical signal in a manner that mitigates, based on calibration data retrieved from a memory or on appropriate performance measures and feedback mechanisms, the detrimental effects of frequency-dependent imbalances between the I and Q sub-channels of at least one of the I/Q channels of the receiver. In various embodiments, the calibration data can be generated and written into the memory at the fabrication facility or in situ while the receiver is being operated in a calibration mode. Alternatively or in addition, I/Q-signal imbalance-correction functions may be generated online during normal operation of the receiver.

In one embodiment, the receiver has a laser source for generating an optical calibration signal whose frequency can be tuned relative to the frequency of a local-oscillator signal. While operating in a calibration mode, the receiver optically mixes the calibration and local-oscillator signals, thereby causing an I/Q channel that is being calibrated to generate a pair of time-dependent digital signals having a beat frequency corresponding to the frequency difference between the calibration and local-oscillator signals. The digital signal processor processes this signal pair to determine one or both of the frequency-dependent amplitude imbalance and the frequency-dependent phase imbalance between the I- and Q-signals of the pair. The data that characterize the imbalance are then written into the memory as calibration data for this particular I/Q channel for the applicable operating conditions, such as the temperature, carrier wavelength(s), and/or optical power levels corresponding to the calibration. Advantageously, the processor invokes the calibration data during normal operation of the receiver to reduce the BER (bit-error rate) penalty associated with the I/Q-signal imbalance in the channel.

Also disclosed herein is frequency-dependent I/Q-signal imbalance correction for optical transmitters. Such I/Q-signal imbalance correction may be applied to correct imbalances in the optoelectronic circuitry of the front end of a transmitter, where electrical digital signals are converted into corresponding modulated optical signals.

According to one embodiment, provided is an optical receiver having a front end that has one or more I/Q channels, each of said I/Q channels being adapted to convert a modulated optical signal into a respective digital I/Q-signal pair. The optical receiver further has a digital signal processor being connected to process the one or more digital I/Q-signal pairs to recover data carried by the modulated optical signal based on a frequency-dependent I/Q-signal imbalance correction applied to at least one of said digital I/Q-signal pairs.

According to another embodiment, provided is a method of demodulating a modulated optical signal having the steps of: (A) converting the modulated optical signal into a digital I/Q-signal pair using an I/Q channel of an optical receiver; (B) applying a frequency-dependent I/Q-signal imbalance correction to the digital I/Q-signal pair to generate a corrected signal; and (C) recovering data carried by the modulated optical signal based on the corrected signal.

According to yet another embodiment, provided is an optical transmitter having a front end that has having one or more I/Q channels, each of said I/Q channels being adapted to convert a respective digital I/Q-signal pair into a modulated optical signal. The optical transmitter further has a digital signal processor being connected to process the one or more digital I/Q-signal pairs to apply a frequency-dependent I/Q-signal imbalance correction to at least one of said digital I/Q-signal pairs. The front end operates to produce a frequency-dependent I/Q-signal imbalance comprising at least one of (i) a frequency-dependent I/Q-amplitude imbalance between I and Q sub-channels of at least one I/Q channel and (ii) a frequency-dependent I/Q-phase imbalance between I and Q sub-channels of at least one I/Q channel. The applied frequency-dependent I/Q-signal imbalance correction mitigates a detrimental effect of said frequency-dependent I/Q-signal imbalance on the modulated optical signal.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Figure 1A:
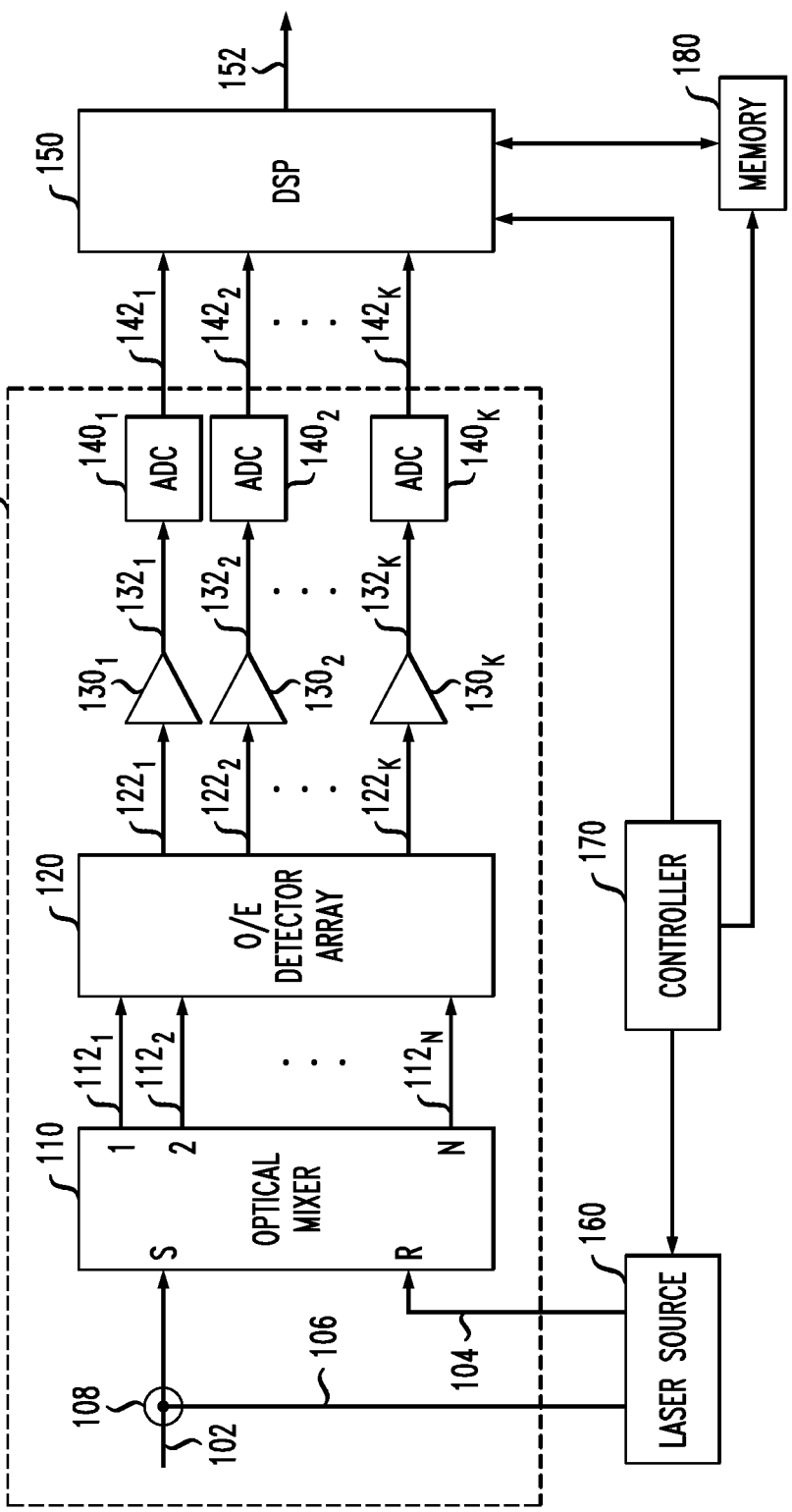
FIGS. 1A-1C show a block diagram and signal-transfer characteristics of a coherent optical receiver according to one embodiment of the invention.
Figure 1B:
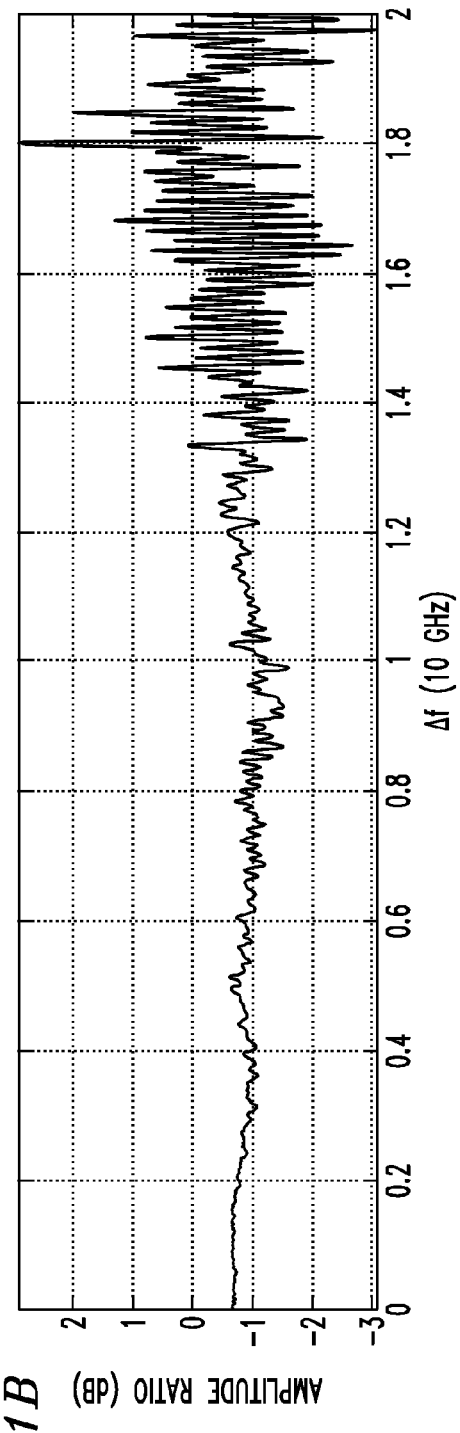
Figure 1C:
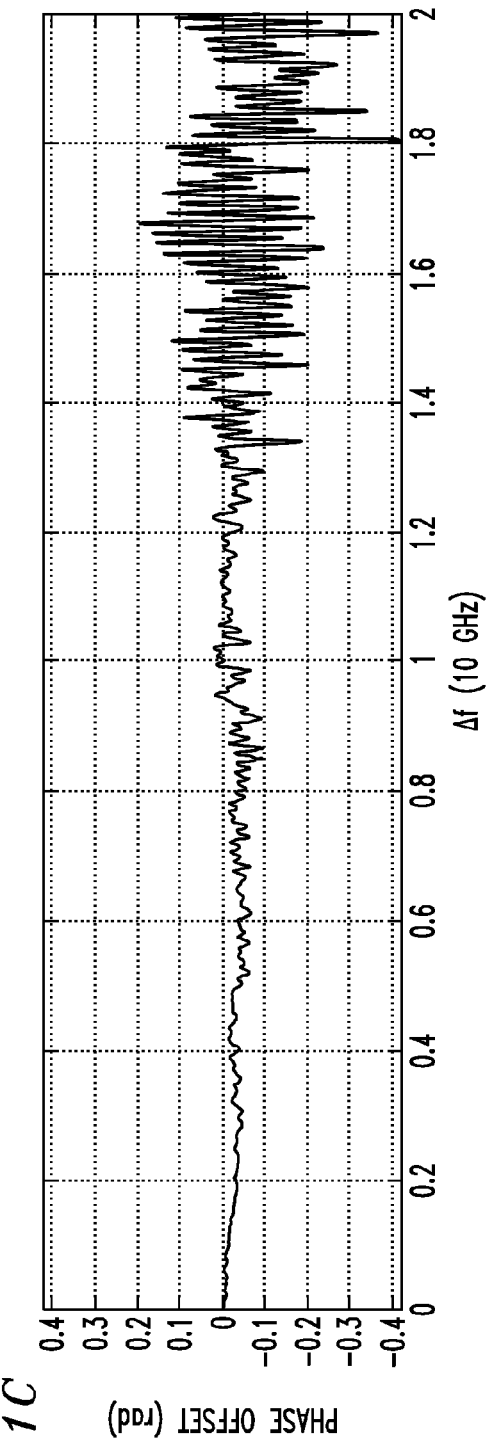

FIGS. 1A-1C illustrate a coherent optical receiver 100 according to one embodiment of the invention. More specifically, FIG. 1A shows a block-diagram of receiver 100. FIGS. 1B and 1C graphically illustrate frequency-dependent amplitude and phase imbalances for I and Q sub-channels of an I/Q channel of receiver 100.

Receiver 100 has an optical mixer 110 having (i) two input ports labeled S and R and (ii) a plurality of output ports labeled 1 through N. Input port S can receive, through an optical coupler 108, either a modulated optical-input signal 102 generated by a remote transmitter (not explicitly shown in FIG. 1A) or an optical calibration signal 106 generated by a laser source 160, or a desired combination of signals 102 and 106. During normal operation of receiver 100, input port S typically receives only optical-input signal 102, with optical calibration signal 106 being blocked or turned off. Similarly, during calibration of receiver 100, input port S typically receives only optical calibration signal 106, with optical-input signal 102 being blocked or turned off. Input port R receives an optical reference signal 104 generated by laser source 160. In various embodiments, laser source 160 may comprise a combination of tunable and/or CW lasers, optical frequency converters, optical modulators, and optical filters appropriately connected to one another to enable the generation of optical signals 104 and 106.

In one embodiment, input signal 102 is a polarization-division-multiplexed (PDM) optical communication signal having two independently modulated polarization components. Reference signal 104 is a local-oscillator (LO) signal having substantially the same optical-carrier frequency (wavelength) as optical communication signal 102. Reference signal 104 can be generated, e.g., using a tunable laser controlled by a wavelength-control loop (not explicitly shown in FIG. 1A) that forces an output wavelength of the tunable laser to substantially track the carrier wavelength of optical communication signal 102.

During normal operation, optical mixer 110 mixes input signal 102 and reference signal 104 to generate N mixed optical signals $112_1$-$112_N$, where N is an integer greater than 1. A detector array 120 converts optical signals $112_1$-$112_N$ into K electrical signals $122_1$-$122_K$ that are indicative of complex values corresponding to the independently modulated components of signal 102, where K is an integer greater than 1. For example, electrical signals $122_1$ and $122_2$ may be an analog in-phase (I) signal and an analog quadrature-phase (Q) signal, respectively, corresponding to an X-polarization component of input signal 102.

Each of electrical signals $122_1$-$122_K$ may be amplified in a corresponding one of K amplifiers $130_1$-$130_K$. Each of the resulting amplified signals $132_1$-$132_K$ is converted into digital form in a corresponding one of K analog-to-digital converters (ADCs) $140_1$-$140_K$. The resulting digital signals $142_1$-$142_K$ are processed by a digital signal processor (DSP) 150, e.g., as further described below, to recover the data carried by input signal 102. The recovered data are output from receiver 100 via an output signal 152. In a representative embodiment, N=8 and K=4.

As used herein, the term "I/Q channel" refers to the optoelectronic circuitry that converts an optical component of an input signal (e.g., signal 102) into a digital signal pair comprising (i) a digital in-phase (I) signal corresponding to the optical component and (ii) a digital quadrature-phase (Q) signal corresponding to the optical component. For example, receiver 100 has an I/Q channel that produces digital I-signal $142_1$ and digital Q-signal $142_2$. This I/Q channel comprises a corresponding portion of optical mixer 110, a corresponding portion of detector array 120, amplifiers $130_1$-$130_2$, and ADCs $140_1$-$140_2$. The circuitry that produces I-signal $142_1$ is referred to as the I sub-channel of the I/Q channel. The circuitry that produces Q-signal $142_2$ is referred to as the Q sub-channel of the I/Q channel.

As already indicated above, the I and Q sub-channels of an I/Q channel in receiver 100 may suffer from amplitude and phase imbalances that are detrimental to the performance characteristics of the receiver. While studying these imbalances through experimentation and simulation, we have discovered that these imbalances can depend relatively strongly on frequency in general and on the frequency offset (Δf) from the optical-carrier frequency in particular. The frequency-dependent nature of the I/Q-signal imbalances causes the front end of receiver 100 (boxed by a dashed line and labeled 144 in FIG. 1A) to have frequency-dependent image bands in its signal-transfer characteristics. If left uncorrected, these image bands produce crosstalk between different spectral components of the communication signal, thereby imposing a significant SNR (signal-to-noise ratio) penalty on digital signals $142_1$-$142_K$. To the best of our knowledge, the problem of SNR penalty due to frequency-dependent I/Q-signal imbalances in a coherent optical receiver is not recognized in the prior art. Consequently, no solutions to this problem appear to exist yet because known prior-art solutions directed to the correction of frequency-independent I/Q-signal imbalances in a coherent optical receiver are ineffective for the correction of frequency-dependent I/Q-signal imbalances.

Receiver 100 has a digital signal processor (DSP) 150 that, among other functions, performs digital correction of digital signals $142_1$-$142_K$ for any frequency-dependent I/Q-signal imbalances imposed by front end 144. The correction is performed based on calibration data retrieved from a memory 180. In various embodiments, the calibration data can be generated and stored in memory 180 (i) at the manufacturing facility during the testing and characterization of front end 144 and/or (ii) in situ while receiver 100 is being operated in a special calibration mode. The calibration data may cover a variety of relevant operating conditions, such as different operating temperatures, different optical-carrier and/or LO frequencies, different power levels, etc.

FIGS. 1B-C graphically show a representative set of calibration data generated by receiver 100 while operating in a calibration mode. More specifically, FIG. 1B graphically shows the I/Q-amplitude imbalance for the I and Q sub-channels that generate digital I-signal $142_1$ and digital Q-signal $142_2$, respectively. FIG. 1C similarly shows the I/Q phase imbalance for those two sub-channels. Note that the oscillatory structure in the curves shown in FIGS. 1B and 1C is not noise, but a well-reproducible ripple with a characteristic period of about 100 MHz. The sets of calibration data corresponding to other I/Q channels of front end 144 are analogous to the set shown in FIGS. 1B and 1C.

When receiver 100 enters a calibration mode, input signal 102 is blocked, and a controller 170 configures laser source 160 to apply reference signal 104 and calibration signal 106 to ports S and R, respectively, of optical mixer 110. Reference signal 104 is a CW signal whose frequency (wavelength) is set to the optical carrier frequency (wavelength) of interest, e.g., at one of the expected carrier frequencies of input signal 102. Calibration signal 106 is a CW signal whose frequency is slowly swept, under control of controller 170, across a spectral range of interest while frequency offset $\Delta f$ between signals 104 and 106 is being monitored and communicated by the controller to digital signal processor 150. Under these conditions, for each frequency of signal 106, each of digital signals $142_1$-$142_K$ is a time-dependent periodic signal having an oscillation frequency of $\Delta f$.

If front end 144 had ideal signal-transfer characteristics, then digital I-signal $142_1$ and digital Q-signal $142_2$ would have the following frequency-independent characteristics: (1) the amplitudes of signals $142_1$ and $142_2$ would be equal to each other and (2) there would be a 90-degree phase difference between signals $142_1$ and $142_2$. However, implementation imperfections cause the signal-transfer characteristics of front end 144 to deviate from the ideal ones. FIG. 1B quantifies the deviation of signals $142_1$ and $142_2$ from the ideal-case scenario by showing the measured amplitude ratio for these signals as a function of $\Delta f$ (plotted in 10-GHz units). FIG. 1C similarly quantifies the deviation of signals $142_1$ and $142_2$ from the ideal-case scenario by showing the deviation from 90 degrees of the measured phase difference between these signals as a function of $\Delta f$. When an I/Q channel of front end 144 has one or more of such deviations it is said that the I/Q channel produces or is characterized by an I/Q-signal imbalance.

While operating in the calibration mode, digital signal processor 150 appropriately processes digital signals $142_1$ and $142_2$ to determine their amplitudes (hereafter denoted as $A_I(\Delta f)$ and $A_Q(\Delta f)$, respectively) as a function of $\Delta f$, with a selected frequency resolution. The physical meaning of $A_I(\Delta f)$ and $A_Q(\Delta f)$ is that each of them represents a spectral transfer function of the corresponding sub-channel that has been discretely sampled with the specified spectral resolution. Based on the processing, digital signal processor 150 also determines the phase difference (hereafter denoted as $\Phi_{IQ}(\Delta f)$) between signals $142_1$ and $142_2$ as a function of $\Delta f$, with the selected frequency resolution. Digital signal processor 150 may optionally convert $A_I(\Delta f)$, $A_Q(\Delta f)$, and $\Phi_{IQ}(\Delta f)$ into a form that may be more convenient for a particular I/Q-signal imbalance correction procedure invoked by the processor during normal operation of receiver 100. For example, digital signal processor 150 may calculate the following quantities:

$$H_{IQ}(\Delta f) = \frac{A_I(\Delta f)}{A_Q(\Delta f)} \quad (1)$$

$$\varphi_{IQ}(\Delta f) = \Phi_{IQ}(\Delta f) - 90° \quad (2)$$

where $H_{IQ}(\Delta f)$ is the frequency-dependent amplitude ratio, and $\phi_{IQ}(\Delta f)$ is the frequency-dependent deviation of the phase difference from 90 degrees. Digital signal processor 150 may then transfer either an appropriate subset or all of $A_I(\Delta f)$, $A_Q(\Delta f)$, $\Phi_{IQ}(\Delta N)$, $H_{IQ}(\Delta f)$, and $\phi_{IQ}(\Delta f)$ to memory 180 for storage. A set of calibration data transferred to memory 180 can be appended with an appropriate preamble or header that characterizes the operating conditions to which these calibration data are applicable. Data for said preamble may be supplied to memory 180 by controller 170 and may include (1) the temperature of front end 144 at which the calibration data were collected, (2) the frequency or wavelength of reference signal 104, (3) the power levels of signals 104 and 106, etc.

To generate calibration data for other I/Q channels of front end 144, the above-described calibration-data collection and processing procedures are also performed based on other I/Q pairs of digital signals 142. To cover different possible operating conditions, calibration data may similarly be collected at different selected operating temperatures, different selected reference frequencies, different selected power levels, etc., and then transferred to memory 180 for storage under appropriate headers. During normal operation of receiver 100, digital signal processor 150 may access memory 180 to retrieve one or more sets of applicable calibration data to enable the I/Q-signal imbalance correction. Interpolation and/or extrapolation methods may be applied to the retrieved calibration data to obtain one or more modified calibration-data sets that are more suitable for use under the specific operating conditions of receiver 100 at the time of the I/Q-signal imbalance correction. Several representative implementations of frequency-resolved I/Q-signal imbalance correction that rely on the calibration data stored in memory 180 are described in more detail below in reference to FIGS. 3-5.

Figure 2:
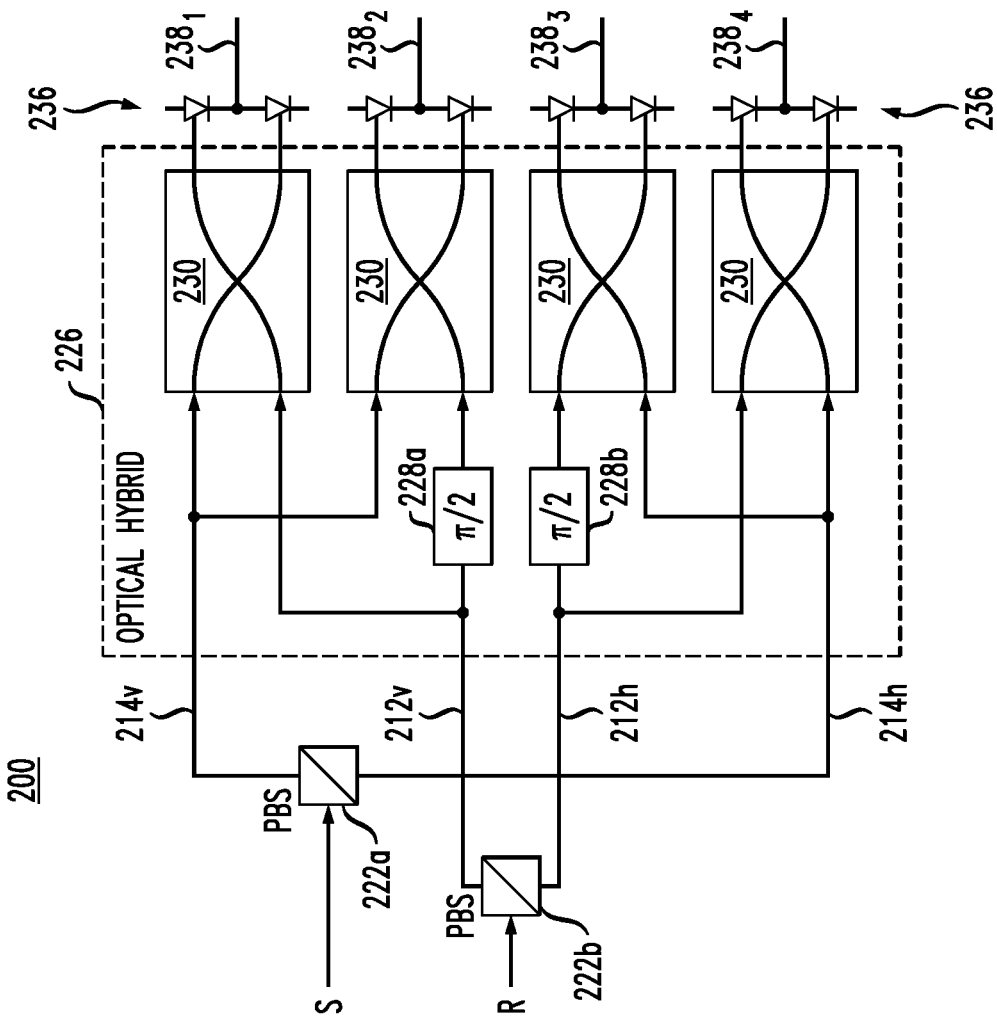
FIG. 2 shows a block diagram of an optical-to-electrical (O/E) converter that can be used in the receiver shown in FIG. 1A according to one embodiment of the invention.

FIG. 2 shows a block diagram of an optical-to-electrical (O/E) converter 200 that can be used in receiver 100 (FIG. 1A) according to one embodiment of the invention. More specifically, O/E converter 200 can be used in receiver 100 in place of optical mixer 110 and detector array 120. O/E converter 200 implements polarization-sensitive coherent detection of a PDM optical signal applied to input port S. More specifically, O/E converter 200 mixes the PDM signal and an optical local-oscillator (e.g., reference) signal applied to input port R to generate electrical output signals $238_1$-$238_4$. Electrical output signals $238_1$ and $238_2$ are an I/Q signal pair corresponding to the vertical (or Y) polarization component of the PDM signal. Similarly, electrical output signals $238_3$ and $238_4$ are an I/Q signal pair corresponding to the horizontal (or X) polarization component of the PDM signal.

O/E converter 200 has two polarization beam splitters (PBSs) 222a-b that decompose the PDM and reference signals, respectively, into two respective vertically polarized components 214v and 212v and two respective horizontally polarized components 214h and 212h. These polarization components are then directed to an optical hybrid 226. Various optical hybrids that are suitable for implementing optical hybrid 226 are commercially available, e.g., from Optoplex Corporation of Fremont, Calif., and CeLight, Inc., of Silver Spring, Md. In one embodiment, O/E converter 200 is an integrated planar-waveguide circuit.

Optical hybrid 226 splits each of polarization components 212v, 214v, 212h, and 214h into two (attenuated) copies, e.g., using conventional 3-dB power splitters. A relative phase shift of 90 degrees (π/2 radian) is then applied to one copy of component 212v and one copy of component 212h using phase shifters 228a-b, respectively. The various copies are optically mixed as shown in FIG. 2 using four 2×2 signal mixers 230, and the mixed optical signals produced by the mixers are detected by eight photo-detectors (e.g., photodiodes) 236.

Photo-detectors 236 are arranged in pairs, as shown in FIG. 2, and the output of each photo-detector pair is a corresponding one of electrical signals $238_1$-$238_4$. One skilled in the art will appreciate that electrical signal $238_1$ is a measure of the real part of vertically polarized component 214v in the complex plane defined by the reference signal. Similarly, electrical signal $238_2$ is a measure of the imaginary part of vertically polarized component 214v in that complex plane; electrical signal $238_4$ is a measure of the real part of horizontally polarized component 214h in that complex plane; and electrical signal $238_3$ is a measure of the imaginary part of horizontally polarized component 214h in that complex plane. After amplification in amplifiers 130 and analog-to-digital conversion in ADCs 140 (see FIG. 1A), electrical signals $238_1$-$238_4$ become digital signals $142_1$-$142_4$, respectively.

Additional O/E converters that can be used to implement front end 144 in other embodiments of receiver 100 (FIG. 1A) are disclosed, e.g., in U.S. Patent Application Publication No. 2010/0158521, U.S. patent application Ser. No. 12/541,548 (filed on Aug. 14, 2009), and International Patent Application No. PCT/US09/37746 (filed on Mar. 20, 2009), all of which are incorporated herein by reference in their entirety. Such O/E converters may use various single-ended detection schemes instead of or in addition to the balanced detection described above in reference to FIG. 2. One skilled in the art will appreciate that, depending on the type of O/E converter used in receiver 100, frequency-resolved I/Q-signal imbalance correction implemented in digital signal processor 150 can be applied to various corresponding components of input signal 102 without departing from the scope and principles of the present invention. For example, such a component can be a wavelength-division-multiplexed (WDM) component, an orthogonal-frequency division multiplexed (OFDM) component, and/or a PDM component.

Figure 3A:
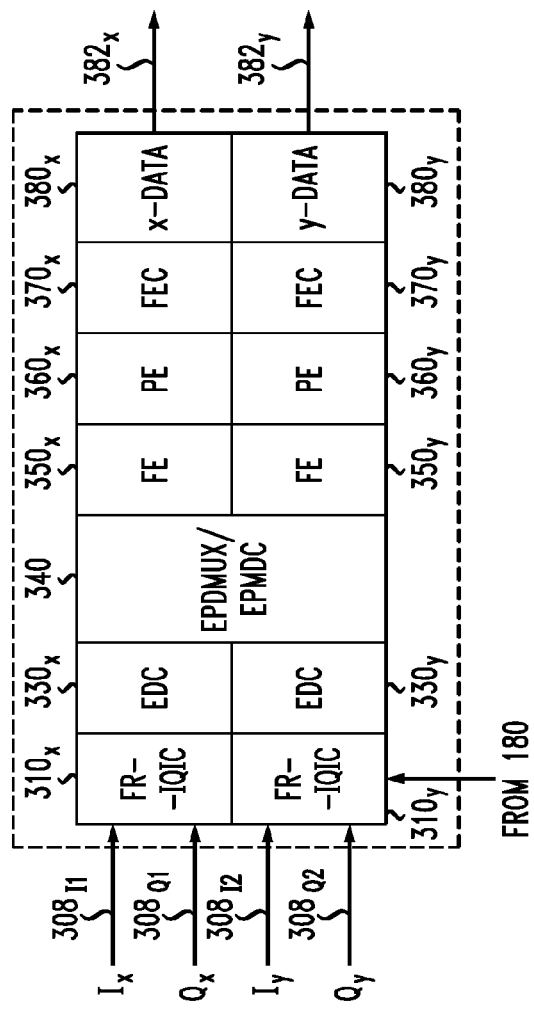
FIGS. 3A and 3B show block diagrams of a digital signal processor that can be used in the receiver shown in FIG. 1A according to one embodiment of the invention.
Figure 3B:
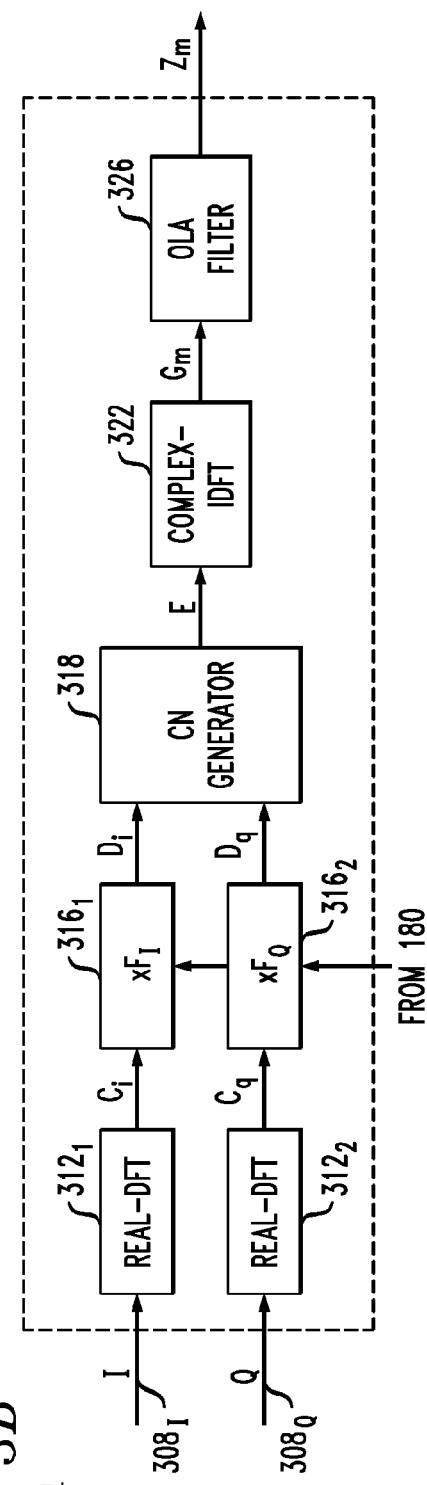

FIGS. 3A and 3B show block diagrams of a digital signal processor 300 that can be used as digital signal processor 150 (FIG. 1A) according to one embodiment of the invention. More specifically, FIG. 3A shows an overall block diagram of digital signal processor 300. FIG. 3B shows a block diagram of a frequency-resolved I/Q-imbalance correction (FR-IQIC) module 310 used in digital signal processor 300. Note that digital signal processor 300 is designed for processing PDM signals and can be coupled to front end 144 (FIG. 1A) having O/E converter 200 (FIG. 2).

Referring to FIG. 3A, digital signal processor 300 has the following interconnected processing modules: (1) FR-IQIC modules $310_x$ and $310_y$; (2) electronic dispersion-compensation (EDC) modules $330_x$ and $330_y$; (3) an EPDMUX/EP-MDC module 340, where EPDMUX stands for electronic polarization demultiplexing, and EPMDC stands for electronic polarization-mode dispersion compensation; (4) frequency-estimation and correction (FE) modules $350_x$ and $350_y$; (5) phase-estimation and correction (PE) modules $360_x$ and $360_y$; (6) forward-error correction (FEC) modules $370_x$ and $370_y$; and (7) output-interface ports $380_x$ and $380_y$.

Referring to FIG. 3B, an FR-IQIC module 310 receives a corresponding signal pair consisting of a digital I-signal $308_I$ (e.g., digital I-signal $142_1$, see FIG. 1A) and a digital Q-signal $308_Q$ (e.g., digital Q-signal $142_2$, see FIG. 1A), with input port I receiving the digital I-signal, and input port Q receiving the digital Q-signal. Each of signals $308_I$ and $308_Q$ is subjected to a real discrete Fourier transform (DFT) in a respective one of real-DFT sub-modules $312_1$ and $312_2$ of FR-IQIC module 310. As known in the art, a DFT operation can generally be applied to a sequence of complex numbers, with the result being another sequence of complex numbers. However, if the input sequence consists of real numbers, then the output sequence is half-redundant and can be filtered to also consist of real numbers. A real-DFT sub-module 312 performs a DFT operation with such filtering to generate a respective one of real-valued spectra $C_i$ and $C_q$.

Note that both spectra $C_i$ and $C_q$ are functions of frequency offset $\Delta f$, i.e., $C_i = C_i(\Delta f)$ and $C_q = C_q(\Delta f)$. In a representative configuration, real-DFT sub-module 312 transforms a sequence of M digital values received via its input signal into a set of digital values having L discrete spectral samples representing the corresponding one of spectra $C_i$ and $C_q$, where M and L are positive integers selected so that the frequency increment between two adjacent spectral samples is the same as the spectral resolution of $A_I(\Delta f)$, $A_Q(\Delta f)$, $\Phi_{IQ}(\Delta f)$, $H_{IQ}(\Delta f)$, and/or $\phi_{IQ}(\Delta f)$ stored in memory 180. Other configurations of real-DFT sub-modules 312 are also possible.

Multiplication sub-modules $316_1$ and $316_2$ perform frequency-domain I/Q-signal imbalance correction of spectra $C_i$ and $C_q$ based on the calibration data retrieved, e.g., from memory 180. More specifically, multiplication sub-modules $316_1$ and $316_2$ generate corrected spectra $D_i$ and $D_q$, respectively, by performing the following discrete multiplication operations:

$$D_i(\Delta f) = F_I(\Delta f) \times C_i(\Delta f) \tag{3a}$$

$$D_q(\Delta f) = F_Q(\Delta f) \times C_q(\Delta f) \tag{3b}$$

where $F_I(\Delta f)$ and $F_Q(\Delta f)$ are correction functions. In one embodiment, functions $F_I(\Delta f)$ and $F_Q(\Delta f)$ are expressed by Eqs. (4a)-(4b) as follows:

$$F_I(\Delta f) = 1 \tag{4a}$$

$$F_Q(\Delta f) = H_{IQ}(\Delta f) \tag{4b}$$

where $H_{IQ}(\Delta f)$ is given by Eq. (1). In another embodiment, functions $F_I(\Delta f)$ and $F_Q(\Delta f)$ are expressed by Eqs. (5a)-(5b) as follows:

$$F_I(\Delta f) = \frac{1}{A_I(\Delta f)} \tag{5a}$$

$$F_Q(\Delta f) = \frac{1}{A_Q(\Delta f)} \tag{5b}$$

One skilled in the art will appreciate that, in other embodiments, other suitable correction functions $F_I(\Delta f)$ and $F_Q(\Delta f)$ can be constructed based on the calibration data stored in memory 180. These alternative correction functions can similarly be used in multiplication sub-modules $316_1$ and $316_2$ without departing from the scope and principles of the invention.

A complex-number (CN) generator 318 generates a complex-valued spectrum, $E(\Delta f)$, from the corrected spectra $D_i$ and $D_q$ received from multiplication sub-modules $316_1$ and $316_2$, respectively. In one embodiment, CN generator 318 generates complex-valued spectrum $E(\Delta f)$ using Eq. (6) as follows:

$$E(\Delta f) = D_i(\Delta f) + jD_q(\Delta f) \tag{6}$$

One skilled in the art will appreciate that, in other embodiments, other suitable approaches to generating complex-valued spectrum $E(\Delta f)$ based on corrected spectra $D_i$ and $D_q$, such as approaches that rely on phase-correction calibration data $\phi_Q(\Delta f)$) received from memory 180, can also be implemented in CN generator 318.

Complex-valued spectrum $E(\Delta f)$ is subjected to a complex inverse-DFT (IDFT) transform in a complex-IDFT sub-module 322 to generate a corresponding time-domain sequence of complex numbers $G_m$, where m is an index that represents time in units related to the duration of an optical symbol (e.g., symbol period) in input signal 102. When DFT sub-modules $312_1$ and $312_2$ perform a DFT transform with M≠L, different consecutive sequences $G_m$ generated by complex-IDFT sub-module 322 overlap in time and need to be subjected to overlap-and-add processing, as known in the art, in an (optional) overlap/add (OLA) filter 326. The result of the overlap-and-add processing is an IQ-signal-imbalance-corrected complex-valued data stream $Z_m$ that is directed to EDC module 330.

Referring back to FIG. 3A, EDC module 330 performs digital signal processing that mitigates detrimental effects of chromatic dispersion imposed on input signal 102 by the optical transmission link leading to receiver 100. Various EDC modules that can be used to implement EDC module 330 are disclosed, e.g., in U.S. Pat. Nos. 7,570,889, 7,532,820, and 7,382,984, all of which are incorporated herein by reference in their entirety.

EPDMUX/EPMDC module 340 performs electronic polarization demultiplexing and/or electronic polarization-mode dispersion compensation. Electronic polarization demultiplexing is performed, e.g., when the orientation of the principal polarization axes of PBS 222a (FIG. 2) differs from the orientation of the principal polarization components of input signal 102. Various EPDMUX/EPMDC modules that can be used to implement EPDMUX/EPMDC module 340 are disclosed, e.g., in U.S. Pat. Nos. 7,747,169, 7,315,575, and 7,266,310, all of which are incorporated herein by reference in their entirety.

FE module 350 performs electronic compensation of a mismatch between the carrier-frequency of input signal 102 and the frequency of reference signal 104. Various FE modules that can be used to implement FE module 350 are disclosed, e.g., in U.S. Pat. No. 7,747,177 and U.S. Patent Application Publication No. 2008/0152361, both of which are incorporated herein by reference in their entirety.

PE module 360 performs digital processing that corrects or compensates for slowly changing phase shifts between input signal 102 and reference signal 104, and then estimates the phase of the received optical symbols for constellation mapping and decoding. Various PE modules that can be used to implement PE module 360 are disclosed, e.g., in above-cited U.S. Patent Application Publication No. 2008/0152361 and also in U.S. Pat. No. 7,688,918 and U.S. Patent Application Publication No. 2008/0075472, both of which are incorporated herein by reference in their entirety.

FEC module 370 performs digital processing that implements error correction based on data redundancies in input signal 102. Many FEC methods suitable for use in FEC module 370 are well known in the art. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

Output-interface ports $380_x$ and $380_y$ output the decoded data corresponding to the X and Y polarizations, respectively, of input signal 102. The decoded X-polarization data are provided to external circuits via an output signal $382_x$, and the decoded Y-polarization data are similarly provided via an output signal $382_y$. Multi-port DSP architectures are well known in the art and are described, e.g., in U.S. Pat. Nos. 7,472,155 and 5,845,093, both of which are incorporated herein by reference in their entirety.

Figure 4:
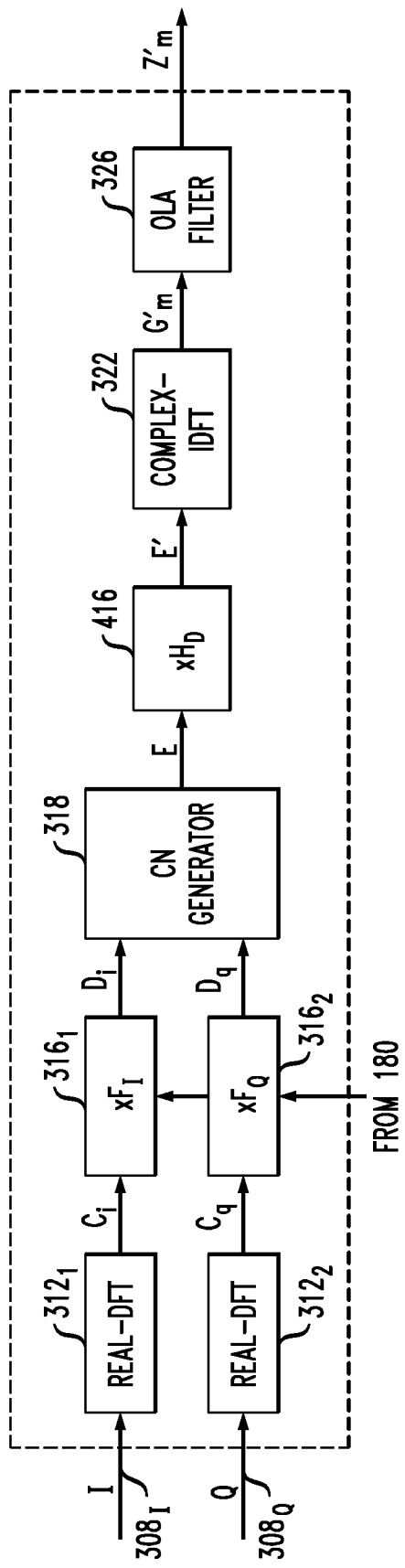
FIG. 4 shows a block diagram of a processing module that can be used in the digital signal processor shown in FIG. 3A according to one embodiment of the invention.

FIG. 4 shows a block diagram of a processing module 400 that can be used in place of a tandem consisting of FR-IQIC module 310 and EDC module 330 (FIG. 3) according to one embodiment of the invention. Processing module 400 is generally similar to FR-IQIC module 310 (FIG. 3B) because these two modules use many of the same similarly connected sub-modules. The description of these sub-modules is not repeated here. Instead, the description of processing module 400 below primarily focuses on the differences between this processing module and FR-IQIC module 310 (FIG. 3B).

Processing module 400 implements both frequency-resolved I/Q-signal imbalance correction and electronic dispersion compensation in the frequency domain so that both of these operations can share the functionality of DFT sub-modules $312_1$ and $312_2$, complex-IDFT sub-module 322, and OLA filter 326. A multiplication sub-module 416 coupled between CN generator 318 and complex-IDFT sub-module 322 performs electronic dispersion compensation by generating a product of complex-valued spectrum $E(\Delta f)$ produced by CN generator 318 and a dispersion-correction function, $H_D$. Function $H_D$ spectrally filters spectrum $E(\Delta f)$ so as to reduce the detrimental effects of phase and amplitude distortions imposed by chromatic dispersion in the optical transmission link. The output of multiplication sub-module 416 is an EDC-corrected complex-valued spectrum, E Ulf), which is thereafter processed similar to complex-valued spectrum $E(\Delta f)$ in FR-IQIC module 310 (FIG. 3B). Representative methods that can be used to determine function $H_D$ for use in processing module 400 are disclosed, e.g., in U.S. Pat. No. 7,623,578, which is incorporated herein by reference in its entirety.

Figure 5:
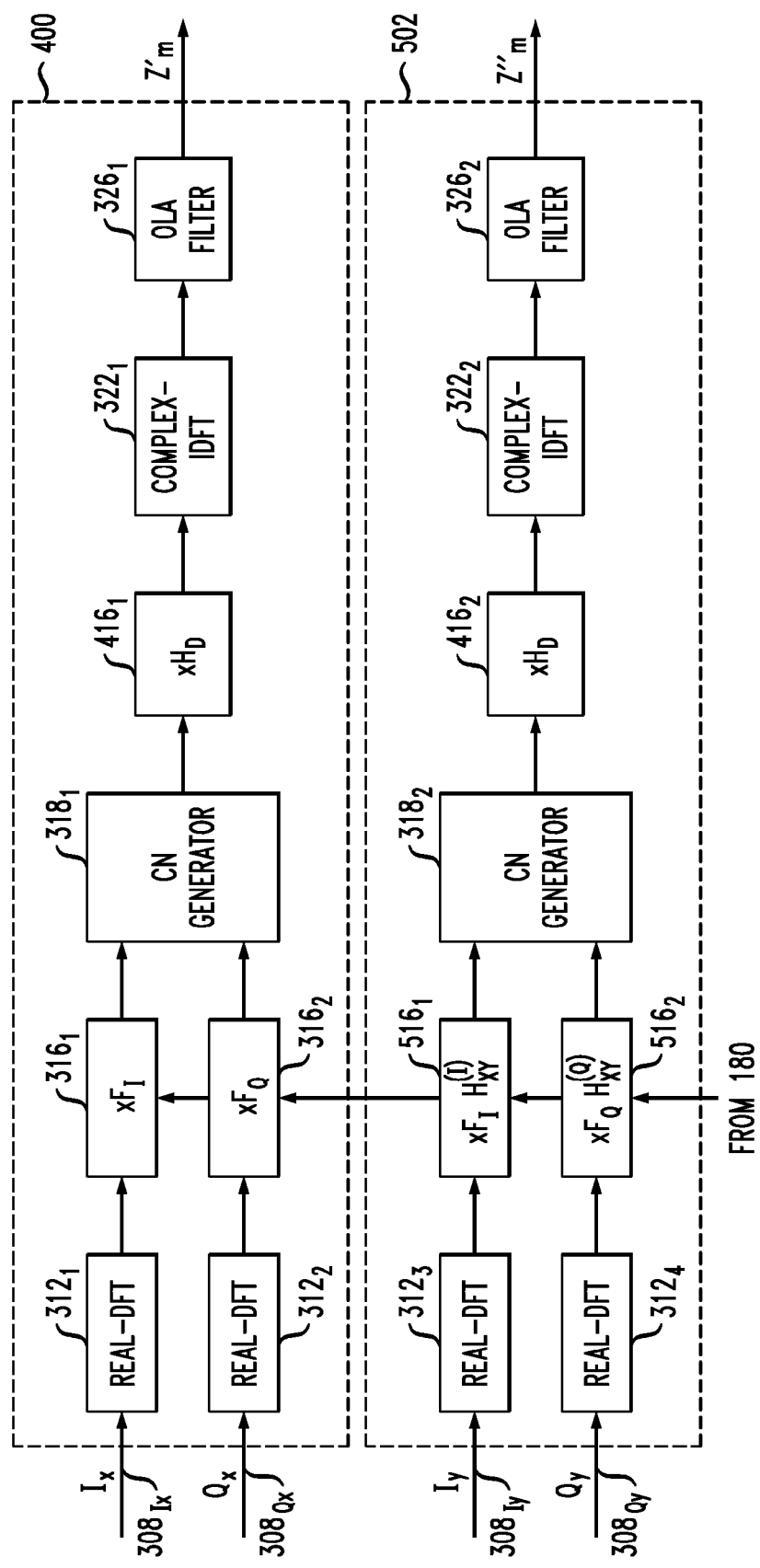
FIG. 5 shows a block diagram of a processing module that can be used in the digital signal processor shown in FIG. 3A according to another embodiment of the invention.

FIG. 5 shows a block diagram of a processing module 500 that can be used in place of FR-IQIC modules $310_x$ and $310_y$ and EDC modules $330_x$ and $330_y$ (FIG. 3) according to another embodiment of the invention. Processing module 500 comprises a processing module 400 (FIG. 4) and a processing module 502 arranged in parallel to one another. Processing module 502 is generally similar to processing module 400 in that it uses many of the same sub-modules. However, one difference between processing modules 400 and 502 is that the latter uses multiplication sub-modules $516_1$ and $516_2$ instead of multiplication sub-modules $316_1$ and $316_2$, respectively.

Multiplication sub-module 516 differs from multiplication sub-module 316 in that multiplication sub-module 516 performs two multiplication operations using two different functions as the corresponding multiplication factors. The first of said two functions is a corresponding one of correction functions $F_I(\Delta f)$ and $F_Q(\Delta f)$ (see, e.g., Eqs. (4)-(5) above). The second of said two functions is a corresponding one of polarization-imbalance correction functions $H_{XY}^{(I)}(\Delta f)$ and $H_{XY}^{(Q)}(\Delta f)$. Similar to correction functions $F_I(\Delta f)$ and $F_Q(\Delta f)$, polarization-imbalance correction functions $H_{XY}^{(I)}(\Delta f)$ and $H_{XY}^{(Q)}(\Delta f)$ are constructed based on the calibration data, e.g., retrieved from memory 180 (FIG. 1A).

Polarization-imbalance correction functions $H_{XY}^{(I)}(\Delta f)$ and $H_{XY}^{(Q)}(\Delta f)$ are invoked when, in addition to frequency-dependent I/Q-signal imbalance, front end 144 (FIG. 1A) has frequency-dependent polarization imbalance. Frequency-dependent polarization imbalance causes the I/Q-amplitude imbalance (see FIG. 1B) and/or the I/Q-phase imbalance (see FIG. 1C) for an I/Q channel of front end 144 to also depend on the polarization of the input signal applied to that I/Q channel. Polarization-imbalance correction functions $H_{XY}^{(I)}(\Delta f)$ and $H_{XY}^{(Q)}(\Delta f)$ quantify polarization-specific changes of the transfer function and are invoked, e.g., when the application of correction functions $F_I(\Delta f)$ and $F_Q(\Delta f)$ alone is deemed insufficient for attaining a desired BER.

In one embodiment, calibration data for constructing functions $H_{XY}^{(I)}(\Delta f)$ and $H_{XY}^{(Q)}(\Delta f)$ can be acquired during a calibration mode of receiver 100, e.g., using an embodiment of O/E converter 200, in which polarization beam splitters (PBSs) 222a-b are reconfigurable (see FIG. 2). More specifically, in one configuration of polarization beam splitters 222a-b, optical signals 212v and 214v may be X-polarized, and optical signals 212h and 214h may be Y-polarized. In another configuration of polarization beam splitters 222a-b, optical signals 212v and 214v may be Y-polarized, and optical signals 212h and 214h may be X-polarized. The calibration procedure described above in reference to FIG. 1 is carried out in each of these two configurations of polarization beam splitters 222a-b to acquire for each I/Q channel the following sets of calibration data: $A_{IX}(\Delta f)$, $A_{QX}(\Delta f)$, $A_{IY}(\Delta f)$, and $A_{QY}(\Delta f)$, where the subscripts X and Y indicate the respective polarization used during the calibration-data acquisition. Polarization-imbalance correction functions $H_{XY}^{(I)}(\Delta f)$ and $H_{XY}^{(Q)}(\Delta f)$ can then be constructed, for example, as follows:

$$H_{XY}^{(I)}(\Delta f) = \frac{A_{IX}(\Delta f)}{A_{IY}(\Delta f)} \tag{7a}$$

$$H_{XY}^{(Q)}(\Delta f) = \frac{A_{QX}(\Delta f)}{A_{QY}(\Delta f)} \tag{7b}$$

In an alternative embodiment employing a fixed configuration of PBSs 222a-b, calibration data can similarly be acquired using input optical signals S and R that are polarized at about 45 degrees with respect to the polarization axes of the PBSs.

Note that, in the particular embodiment of processing module 500 shown in FIG. 5, the X polarization is designated to be a default polarization for the I/Q channel of the corresponding O/E-converter or front end, and polarization-imbalance correction functions $H_{XY}^{(I)}(\Delta f)$ and $H_{XY}^{(Q)}(\Delta f)$ are invoked only if the actual polarization is different from the default polarization. For example, in FIG. 5, processing module 400 is coupled to the I/Q channel of the front end that receives the default (i.e., X) polarization. As a result, processing module 400 employs multiplication sub-modules 316, which do not apply polarization-imbalance correction function $H_{XY}^{(I)}(\Delta f)$ or $H_{XY}^{(Q)}(\Delta f)$. In contrast, processing module 502 is coupled to the I/Q channel of the front end that receives the Y polarization. As a result, processing module 502 employs multiplication sub-modules 516, which invoke and apply polarization-imbalance correction functions $H_{XY}^{(I)}(\Delta f)$ and $H_{XY}^{(Q)}(\Delta f)$.

One skilled in the art will appreciate that, in alternative embodiments, multiplication sub-modules 316 and 516 in processing module 500 can be configured in a manner that is different from the above-described configuration to perform frequency-resolved I/Q-signal-imbalance and polarization-imbalance corrections. For example, in one representative configuration, instead of the correction functions indicated in FIG. 5, multiplication sub-modules $316_1$, $316_2$, $516_1$, and $516_2$ can be configured to use the following respective correction functions:

$$\frac{1}{A_{IX}(\Delta f)}, \frac{1}{A_{QX}(\Delta f)}, \frac{1}{A_{IY}(\Delta f)}, \text{ and } \frac{1}{A_{QY}(\Delta f)}.$$

Other alternative configurations are also possible.

Figure 6:
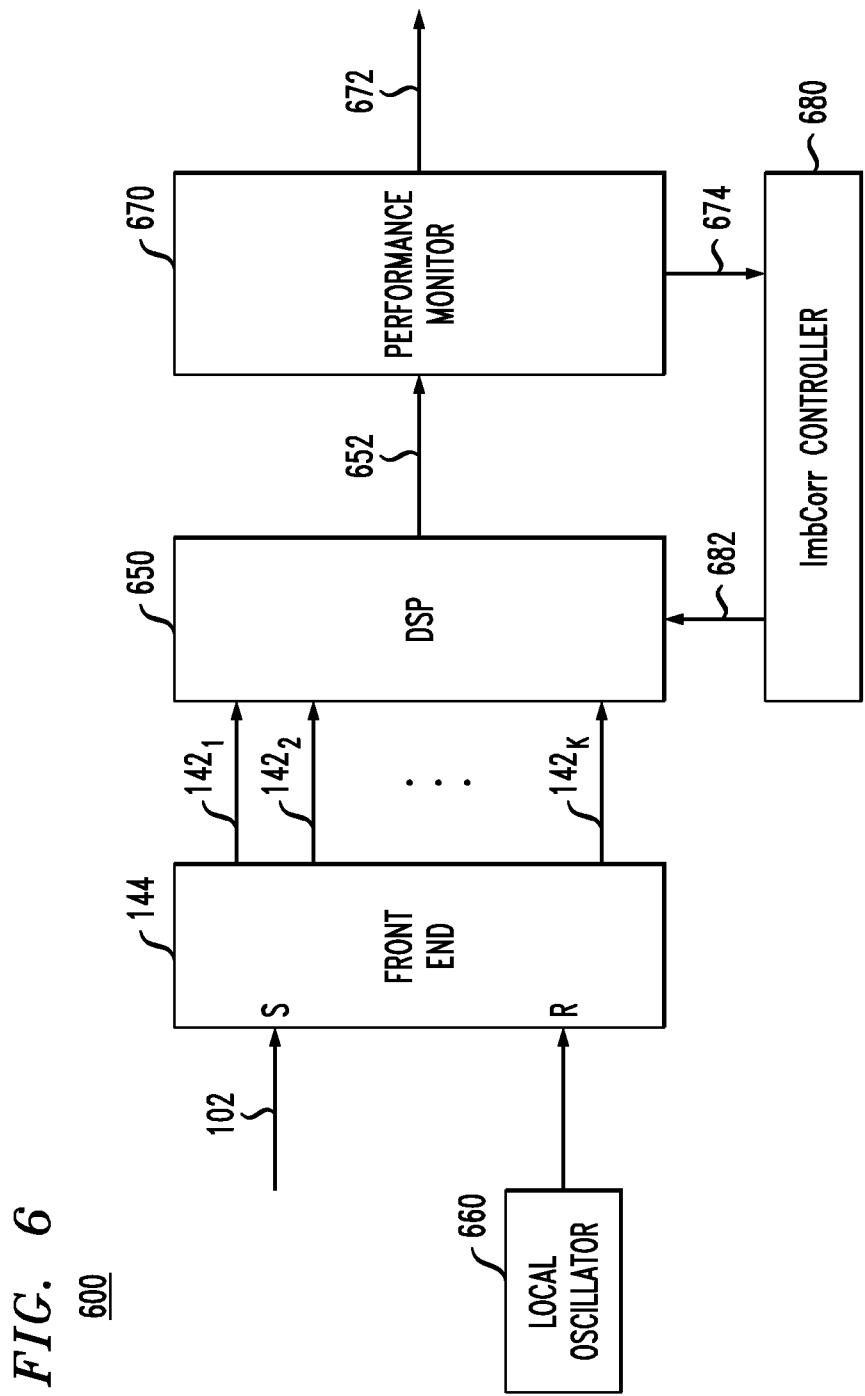
FIG. 6 shows a block diagram of a coherent optical receiver according to another embodiment of the invention.

FIG. 6 shows a block diagram of a coherent optical receiver 600 according to another embodiment of the invention. Receiver 600 employs front end 144, which has been described above in reference to FIG. 1A. However, the configuration of front end 144 in receiver 600 is different from its configuration in receiver 100 (FIG. 1A), e.g., because, in the former, front end 144 is coupled to a local-oscillator source 660 that provides a single optical input to the front end at input port R. In contrast, in FIG. 1A, front end 144 is coupled to laser source 160, which provides two optical inputs to the front end at input ports S and R, respectively. Digital signals $142_1$-$142_K$ generated by front end 144 are applied to DSP 650. Similar to DSP 150 of FIG. 1A, DSP 650 can perform frequency-dependent I/Q-signal imbalance correction, e.g., in a manner described above. However, unlike DSP 150, DSP 650 generates the data for constructing the corresponding correction functions using a feedback signal 682.

Feedback signal 682 is generated by a feedback loop comprising a performance monitor 670 and an online imbalance-correction controller 680. Performance monitor 670 is configured to (i) continuously evaluate the performance of receiver 600 using a selected performance metric, such as the BER, and (ii) communicate the evaluation results, via a signal 674, to controller 680. Controller 680 is configured to compare the performance-metric value received from performance monitor 670 with a target value, such as a target BER value. If the current performance-metric value is worse than the target value, then controller 680 configures DSP 650, via feedback signal 682, to make adjustments to one or more correction functions used by the DSP for the frequency-dependent I/Q-signal imbalance correction until the performance metric is sufficiently improved so that target performance characteristics are achieved. In one embodiment, the on-line data generated by DSP 650 for constructing correction functions are functionally analogous to the calibration data stored in memory 180 of receiver 100 (FIG. 1A). However, the on-line "calibration" data generated by DSP 650 can be dynamically changed to reflect any possible transfer-characteristic changes in front end 144 of receiver 600 during normal operation of the receiver. Also, the on-line "calibration" data may be stored in a volatile memory (e.g., registers) of DSP 650, without the need to have or use a non-volatile memory, such as memory 180 (FIG. 1A).

While this invention has been described with reference to illustrative embodiments, this description is not intended to be construed in a limiting sense. For example, although various embodiments of the invention have been described in reference to optical receivers, the principle of the invention can similarly be applied to optical transmitters. More specifically, frequency-dependent I/Q-signal imbalance correction can be applied to correct any imbalances that might be present in the "front end" of an optical transmitter, wherein such front end comprises optoelectronic circuitry for converting electrical digital signals into modulated optical signals. The front end typically has one or more I/Q channels, each of said I/Q channels being adapted to convert a respective digital I/Q-signal pair into a corresponding component of a modulated optical signal. A digital signal processor is used to process the one or more digital I/Q-signal pairs before these signals are applied to the front end so as to impose a frequency-dependent I/Q-signal imbalance correction that pre-compensates for the frequency-dependent I/Q-signal imbalance produced by the front end. As a result, the transmitter is able to mitigate the detrimental effects of the front-end's frequency-dependent I/Q-signal imbalance on the modulated optical signal.

Further embodiments of the invention(s) may include one or more of the following exemplary modifications. Real-DFT sub-modules $312_1$ and $312_2$ can be replaced by a corresponding complex-DFT module, in which case CN generator 318 may be removed and imbalance-correction operation(s) may be performed using complex-valued correction function(s). Such complex-valued correction function(s) may be combined with other complex-valued correction function(s), such as a function that implements electronic dispersion compensation. Local oscillator 660 can be used instead of laser source 160 in an embodiment of receiver 100 that relies on calibration data generated and written into memory 180 offline at the fabrication facility. Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation on a single integrated circuit.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An optical receiver, comprising:

a front end having one or more I/Q channels, each of said I/Q channels being adapted to convert a modulated optical signal into a respective sequence of digital I/Q-signal pairs, each of the digital I/Q-signal pairs including a respective digital I-signal and a respective digital Q-signal; and a digital signal processor for processing the one or more sequences of the digital I/Q-signal pairs to recover data carried by the modulated optical signal, wherein the digital signal processor is configured to perform a frequency-dependent I/Q-signal imbalance correction by applying a first correction function to the digital I-signals of at least one of said one or more sequences and applying a different second correction function to the digital Q-signals of said at least one of said one or more sequences; and wherein at least one of the first and second correction functions is a function of a frequency offset with respect to a carrier frequency of the modulated optical signal.

2. The optical receiver of claim 1, wherein:
the front end is configured to produce a frequency-dependent I/Q-signal imbalance comprising at least one of (i) a frequency-dependent I/Q-amplitude imbalance between the respective digital I-signals and digital Q-signals and (ii) a frequency-dependent I/Q-phase imbalance between the respective digital I-signals and digital Q-signals; and
the applied first and second correction functions are configured to mitigate a detrimental effect of said frequency-dependent I/Q-signal imbalance on the data recovery.

3. The optical receiver of claim 1, further comprising a feedback loop coupled to an output of the digital signal processor, wherein the digital signal processor is adapted to perform the frequency-dependent I/Q-signal imbalance correction based on a feedback signal provided to the digital signal processor by the feedback loop.

4. The optical receiver of claim 3, wherein:
the feedback loop is adapted to measure a performance metric of the optical receiver and communicate measurement results to the digital signal processor;
the digital signal processor is adapted to determine the first and second correction functions used in the frequency-dependent I/Q-signal imbalance correction based on the measurement results.

5. The optical receiver of claim 1, further comprising a memory coupled to the digital signal processor, wherein the digital signal processor is adapted to generate the first and second correction functions based on calibration data retrieved from the memory.

6. The optical receiver of claim 5, wherein the calibration data have been generated by the optical receiver in a calibration mode.

7. The optical receiver of claim 6, wherein the calibration data have been generated using an external calibration-laser source and written into the memory at a fabrication facility.

8. The optical receiver of claim 6, further comprising a laser source optically coupled to the front end and adapted to generate an optical reference signal and an optical calibration signal so that the optical reference signal has a selected first frequency and the optical calibration signal has a second frequency that is controllably tunable, wherein, during the calibration mode:
the front end is configured to mix the optical reference signal and the optical calibration signal to generate a plurality of time-dependent digital signals having a beat frequency corresponding to a frequency difference between the first frequency and the second frequency; and
the digital signal processor is configured to process the time-dependent digital signals having different beat frequencies produced due to a change of the second frequency to generate the calibration data for storage in the memory.

9. The optical receiver of claim 8, wherein, to recover the data carried by the modulated optical signal during normal operation of the receiver:
the front end is configured to mix the optical reference signal and the modulated optical signal to generate the one or more sequences of the digital I/Q-signal pairs; and
the digital signal processor is configured to recover the data carried by the modulated optical signal based on one or more modified sequences of the digital I/Q-signal pairs generated from the one or more sequences of the digital I/Q-signal pairs using the frequency-dependent I/Q-signal imbalance correction.

10. The optical receiver of claim 1, wherein the digital signal processor is adapted to:
transform the digital I-signals of said at least one of said one or more sequences into a corresponding first discrete spectrum;
apply the first correction function to said first discrete spectrum in a frequency domain;
transform the digital Q-signals of said at least one of said one or more sequences into a corresponding second discrete spectrum; and
apply the second correction function to said second discrete spectrum in the frequency domain.

11. The optical receiver of claim 10, wherein the digital signal processor is further adapted to:
apply electronic dispersion compensation, in addition to the first and second correction functions, to said first and second discrete spectra in the frequency domain to produce a corrected frequency-domain signal;
transform said corrected frequency-domain signal into a corresponding time-domain signal using an inverse Fourier transform; and
recover the data carried by the modulated optical signal based on said time-domain signal.

12. The optical receiver of claim 1, wherein:
the front end comprises:
a first I/Q channel adapted to convert a first polarization of the modulated optical signal into a first sequence of digital I/Q-signal pairs; and
a second I/Q channel adapted to convert a different second polarization of the modulated optical signal into a second sequence of digital I/Q-signal pairs; and
the digital signal processor is adapted to:
apply a first frequency-dependent I/Q-signal imbalance correction to the first sequence of digital I/Q-signal pairs and recover data carried by the first polarization based on the first sequence of digital I/Q-signal pairs corrected by the first frequency-dependent I/Q-signal imbalance correction; and
apply a second frequency-dependent I/Q-signal imbalance correction to the second sequence of digital I/Q-signal pairs and recover data carried by the second polarization based on the second sequence of digital I/Q-signal pairs corrected by the second frequency-dependent I/Q-signal imbalance correction, wherein the data carried by the second polarization are different from the data carried by the first polarization.

13. The optical receiver of claim 12, wherein at least one of the first and second frequency-dependent I/Q-signal imbalance corrections includes a frequency-dependent polarization-imbalance correction.

14. The optical receiver of claim 1, wherein the digital signal processor is further adapted to perform one or more of: (i) electronic dispersion compensation; (ii) electronic polarization-mode dispersion compensation; (iii) frequency estimation and correction; and (iv) phase estimation and correction.

15. A method of demodulating a modulated optical signal, the method comprising:
converting the modulated optical signal into a sequence of digital I/Q-signal pairs using an I/Q channel of an optical receiver, wherein each of the digital I/Q-signal pairs includes a respective digital I-signal and a respective digital Q-signal;

applying a first correction function to the digital I-signals of said sequence;

applying a different second correction function to the digital Q-signals of said sequence; and recovering data carried by the modulated optical signal based on a modified sequence of digital I/Q-signal pairs generated using the steps of applying the first and second correction functions, wherein at least one of the first and second correction functions is a function of a frequency offset with respect to a carrier frequency of the modulated optical signal.

16. The method of claim 15, further comprising generating the first and second correction functions based on calibration data stored in a memory of the receiver.

17. The method of claim 15, wherein:
the step of generating is performed based on a feedback signal provided by a feedback loop, said feedback loop measuring a performance metric corresponding to a demodulated optical signal.

18. An optical receiver, comprising:
a front end having one or more I/Q channels, each of said I/Q channels being adapted to convert a modulated optical signal into a respective digital I/Q-signal pair;

a digital signal processor for processing the one or more digital I/Q-signal pairs to recover data carried by the modulated optical signal, wherein the digital signal processor is configured to apply a frequency-dependent I/Q-signal imbalance correction to at least one of said digital I/Q-signal pairs;

a memory coupled to the digital signal processor, wherein the digital signal processor is adapted to apply the frequency-dependent I/Q-signal imbalance correction based on calibration data retrieved from the memory, wherein the calibration data have been generated by the optical receiver in a calibration mode; and a laser source optically coupled to the front end and adapted to generate an optical reference signal and an optical calibration signal so that the optical reference signal has a selected first frequency and the optical calibration signal has a second frequency that is controllably tunable, wherein, during the calibration mode:

the front end is configured to mix the optical reference signal and the optical calibration signal to generate a plurality of time-dependent digital signals having a beat frequency corresponding to a frequency difference between the first frequency and the second frequency; and the digital signal processor is configured to process the time-dependent digital signals having different beat frequencies produced due to a change of the second frequency to generate the calibration data for storage in the memory.

19. The optical receiver of claim 18, wherein, to recover the data carried by the modulated optical signal during normal operation of the receiver:

the front end is configured to mix the optical reference signal and the modulated optical signal to generate a plurality of time-dependent digital signals corresponding to the data; and the digital signal processor is configured to recover the data carried by the modulated optical signal based on (i) the time-dependent digital signals corresponding to the data carried by the modulated optical signal and (ii) the calibration data stored in the memory.

* * * * *

UNITED STATES PATENT AND TRADEMARK OFFICE
CERTIFICATE OF CORRECTION

PATENT NO. : 9,203,682 B2  Page 1 of 1
APPLICATION NO. : 12/876489
DATED : December 1, 2015
INVENTOR(S) : Winzer et al.

It is certified that error appears in the above-identified patent and that said Letters Patent is hereby corrected as shown below:

On the title page item [54], replace the title "Frequency-Dependent I/Q-Signal Imbalance Correction Coherent Optical Transceivers" with --Frequency-Dependent I/Q-Signal Imbalance Correction For Coherent Optical Transceivers--.

Signed and Sealed this
Twenty-first Day of June, 2016

Michelle K. Lee
*Director of the United States Patent and Trademark Office*